March 5, 1968　　　F. W. THERRIEN　　　3,371,623
CONVERTIBLE RAIL-HIGHWAY VEHICLE WITH RETRACTABLE STEP
Filed Oct. 21, 1965　　　2 Sheets-Sheet 1

INVENTOR.
FRANCIS W. THERRIEN
BY
Kenyon & Kenyon
ATTORNEYS

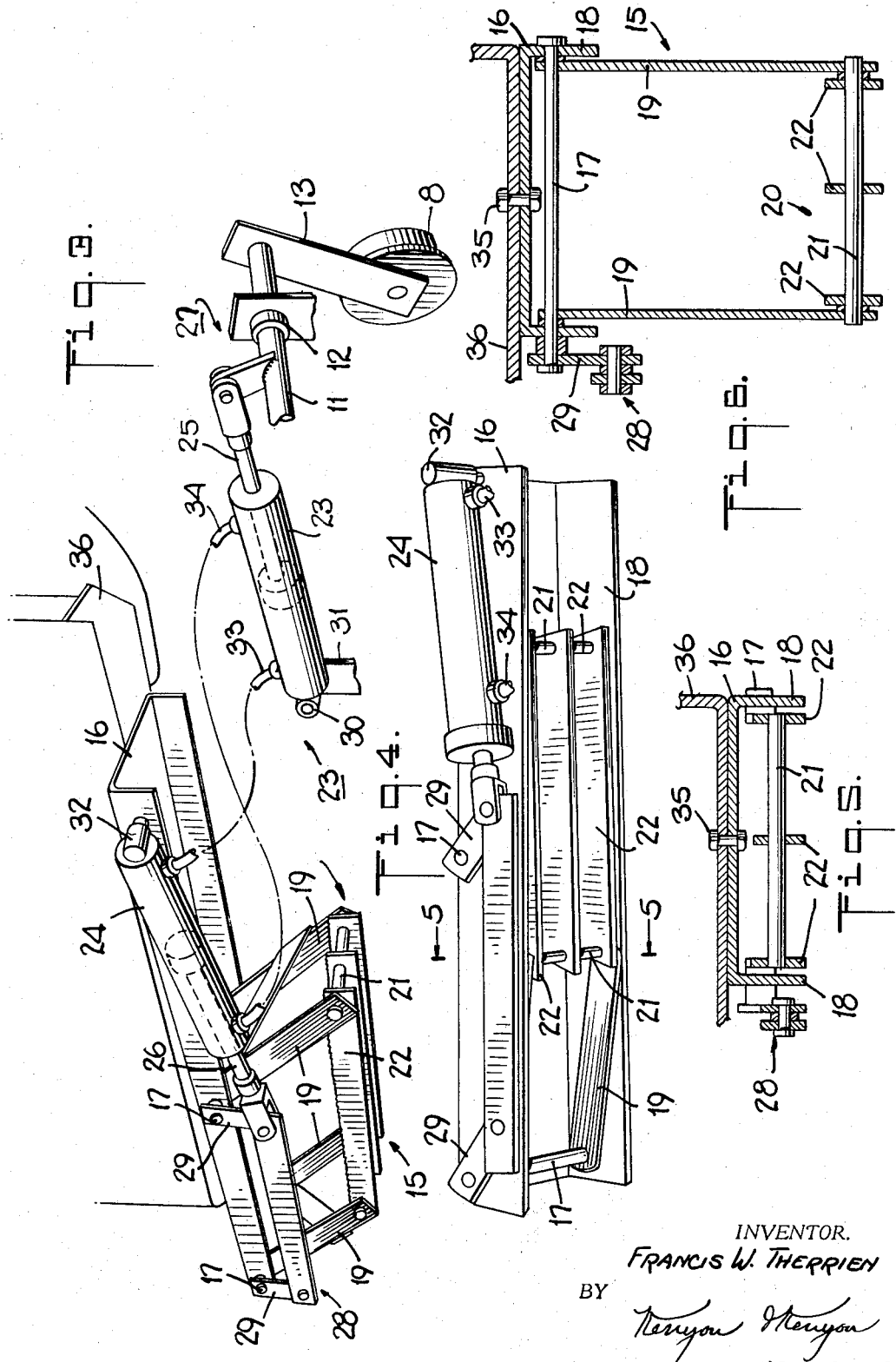

United States Patent Office 3,371,623
Patented Mar. 5, 1968

3,371,623
CONVERTIBLE RAIL-HIGHWAY VEHICLE
WITH RETRACTABLE STEP
Francis W. Therrien, Whitehall, N.Y., assignor of forty-five percent to Raymond L. Therrien, Whitehall, and Carl A. Covell, Glens Falls, N.Y., in equal shares
Filed Oct. 21, 1965, Ser. No. 499,842
3 Claims. (Cl. 105—215)

ABSTRACT OF THE DISCLOSURE

Retractable step for a convertible rail and highway vehicle having means for riding on paved roadways and retractable means for riding on railway tracks, the latter including an arm on a rotatable shaft with a flanged guide wheel mounted thereon and movable between rail engagement and disengagement positions, the retractable step comprising a channel-shaped base secured to the underside of the vehicle and foldable within itself in the longitudinal direction of the vehicle, struts rotatably mounted on the channel-shaped base and linkage means interconnecting the retractable step and said arm including a pair of hydraulic cylinders each having a piston reciprocally movable therein, pivot means operatively connecting the piston of a first of said cylinders to the rotatable shaft for effecting reciprocal movement of said piston in said first of said cylinders, the piston of said second of said cylinders being connected by a pivot linkage to the struts for rotating the latter on said base, and a pair of flexible tubes interconnecting respective opposite ends of the hydraulic cylinders for transmitting hydraulic fluid therethrough from one cylinder to the other whereby movement of said first piston relative to said first cylinder causes an opposite movement of the other piston relative to the second hydraulic cylinder and causes positive retraction or extension of said step in consonance with movement of said flanged guide wheel.

---

This invention relates to a retractable step. More particularly, this invention relates to a retractable step for a vehicle which is adapted to ride on railway tracks or on paved roadways.

Heretofore, it has been known that vehicles which are equipped with the usual rubber tires for traveling on paved roadways can be fitted with a plurality of retractable flanged rollers in order to permit the vehicles to also travel on railway tracks. When mounted on a set of tracks, the flanged rollers are utilized either as guide rollers to maintain the vehicles on the tracks while the rubber tires propel the vehicles, or as drive rollers to propel the vehicles independently of the rubber tires.

However, when a vehicle of the above-described type is mounted on a set of railway tracks, the clearance between the floor of the vehicle and the ground level is increased so that it becomes difficult for a person to enter the vehicle from the ground without some additional step means.

Heretofore, it has been known to provide railway passenger cars with various forms of transversely retractable steps in order to assist passengers in boarding or debarking from the car when there is a rather great distance between the ground and the cars. Generally, the retractable steps are utilized only at the usual railway station in conjunction with a platform. When the railway cars are in motion, the steps are retracted transversely towards the body of the cars.

However, it has not been found practical for many reasons to combine any of the previously known retractable steps with a vehicle as above described. First of all, the prior art steps are too bulky to be installed on the underside of a vehicle body. If they were installed, there would be insufficient clearance between them and a paved roadway when the vehicle is traveling on the paved roadway. Thus, the step mechanisms could easily be damaged. Second, because the prior art steps are generally transversely retractable, a great deal of space would be required in the underside of a vehicle body to house the mechanism for retracting the steps. Third, there has been no foolproof way of positioning a step in its extended position with the flanged rollers other than through its own actuating mechanism.

Accordingly, it is an object of the invention to provide a retractable step for a vehicle which is adapted to ride on paved roadways or railway tracks.

It is another object of the invention to provide a retractable step which requires a minimum of space for a vehicle which is adapted to ride on paved roadways or railway tracks.

It is another object of the invention to provide a vehicle which is adapted for roadway or railway travel with a retractable step which is actuated simultaneously with the actuator for moving the track riding flanged rollers of the vehicle.

It is another object of the invention to provide a vehicle which is adapted for roadway or railway travel with a retractable step which is actuated simultaneously through the track riding flanged rollers of the vehicle.

Generally, the invention provides a vehicle which utilizes a set of rubber tires for riding on paved roadways and a set of retractable flanged rollers for riding on railway tracks with a retractable step secured under the door frame of the vehicle which is automatically actuated upon actuation of the retractable flanged rollers. The retractable step is connected through a linkage means to the actuating mechanism of the flanged rollers so that the step is lowered simultaneously with the lowering of the flanged rollers onto the railway tracks and retracted simultaneously in similar manner. In order to facilitate its operation and to conserve on space and bulk, the retractable step is constructed so as to fold in a longitudinal direction with respect to the vehicle body.

When the vehicle is positioned over a set of tracks, the flanged rollers are actuated to descend onto the tracks in the appropriate manner while at the same time, the retractable step is extended to its fullest extent to provide an assist for a person leaving or entering the rail mounted vehicle. Subsequently, when the vehicle is removed from the railway tracks, the flanged wheels and interconnected step are retracted and stored under the underside of the vehicle within a minimum of space.

These and other objects and advantages of the invention will become more apparent from the following detailed description and appended claims when taken in conjunction with the accompanying drawings in which:

FIG. 3 illustrates a perspective view of the linkage means for actuating the retractable step simultaneously with a retracting guide roller;

FIG. 4 illustrates a perspective view of a retractable step in retracted position interconnected with the linkage means;

FIG. 5 illustrates a view taken at line 5—5 of FIG. 4; and

FIG. 6 illustrates a cross-sectional view of the retractable step of FIG. 4 in extended position.

Figure 1:
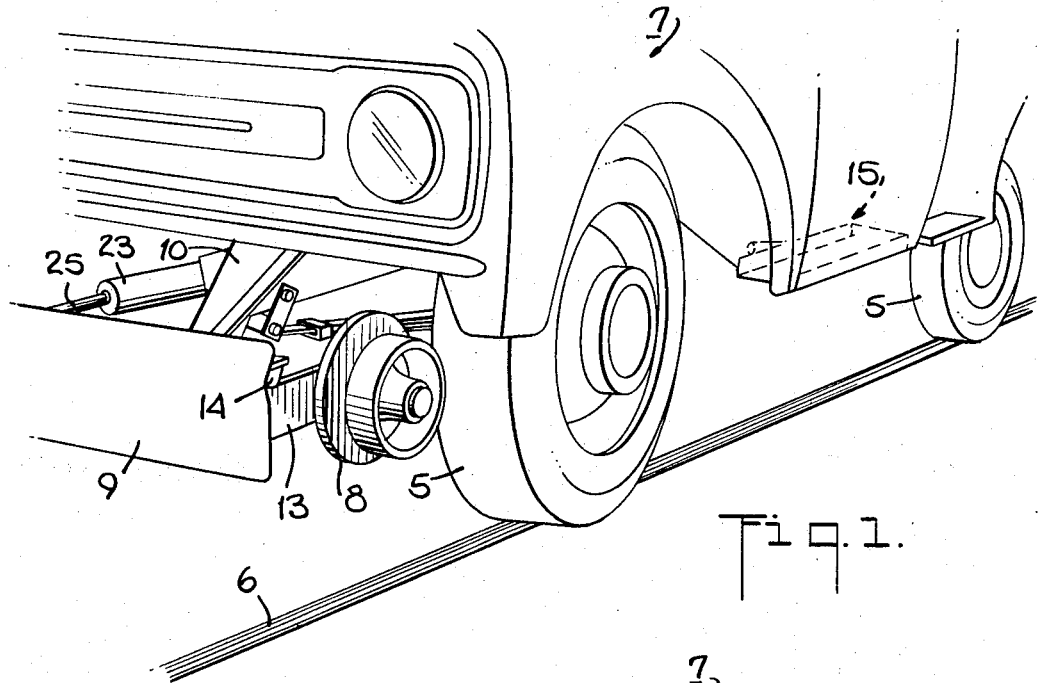
FIG. 1 illustrates a part perspective view of a vehicle of the above described type having the retractable flanged rollers and retractable step in retracted positions.
Figure 2:
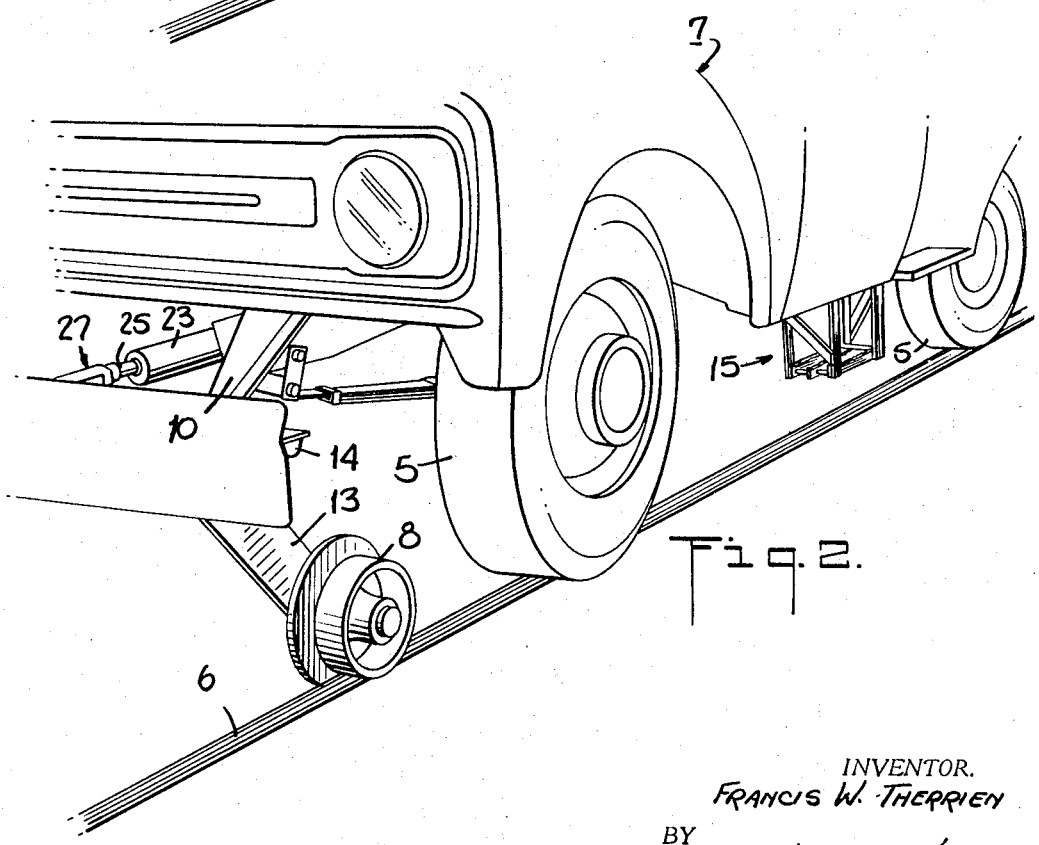
FIG. 2 illustrates a part perspective view of the vehicle of FIG. 1 having the retractable flanged rollers and retractable step in their respective fully extended positions.

Referring initially to FIGS. 1, 2 and 3, a vehicle 7 of conventional structure having tires 5 for riding on paved roadways is provided with a set of retractable flanged rollers 8 for riding on railway tracks 6. The set of rollers 8 are mounted on the vehicle 7 in any suitable manner and actuated by any well known means. For example, a beam frame 9 is secured by suitable brackets 10 to the underside of the vehicle frame and extends forwardly of the vehicle body. The beam frame 9 includes a rotatable shaft 11 (FIG. 3) which is suitably supported therein, as by shaft mountings 12 and which is rotated through a suitable actuating mechanism (not shown) which may be actuated from the interior of the vehicle 7 or from the exterior thereof. Each of the rollers 8 is rollably mounted on a bracket 13 which is secured to the rotatable shaft 11 to rotate therewith so that the rollers 8 will be raised and lowered in relation to the vehicle body upon rotation of the shaft 11 by its actuating mechanism. The beam frame 9 further includes a stop 14 which projects backwardly therefrom for limiting the retracted position of the rollers 8. Also, the beam frame 9 may include a suitable rail sweeping device (not shown) in front of each roller 8 which would be retractable in unison with the bracket 13.

Referring to FIGS. 4, 5 and 6, a retractable step 15 which is adapted for mounting under the door frame on the driver's side of the vehicle 7 is formed so as to be folded within itself in a longitudinal direction with respect to the axis of the vehicle 7. The retractable step 15 has an elongated channel shaped base 16 which supports a pair of rotatable pins 17 in the legs 18 thereof. Each pin 17 carriers a pair of depending struts 19 which are affixed to the pin 17, as by welding, to rotate therewith. The struts 19 are affixed to the pin 17 within the confines of the legs 18 of the channel shaped base 16 and are adjacent to the legs 18 so as to be substantially confined within the limits of the legs 18 upon retraction. The two pairs of struts 19 cooperate to carry a tread means 20 at their lower ends of any suitable type. For example, the tread means 20 includes a pair of spaced apart dowels 21 and a plurality of vertical plates 22 which are fixedly secured to the dowels 21, as by welding. As shown by way of example, three plates are secured near their respective ends to the dowels. Further, the upper surfaces of the plates 22 may be serrated or otherwise roughened to improve the surface gripping characteristics of the plates.

The dowels 21 of the tread means 20 are rotatably mounted in respective pairs of struts 19 so that the tread means 20 will always be substantiailly parallel to the base 16 no matter the position of the struts 19 relative to the base 16.

Referring to FIG. 3, in order to control the movement of the retractable step 15 relative to the movement of the wheels 8 from a retracted position to an extended position and vice versa, a suitable linkage means 23 is secured at one end to the shaft 11 and interconnected at the other end to the retractable step 15.

The linkage means 23 is composed of a pair of hydraulic double action cylinders 23, 24, each of which contains a respective piston 25, 26. The piston 25 of the cylinder 23 is suitably connected to a pivot means 27 which is affixed to the shaft 11 so that upon rotation of the shaft 11, the piston 25 will be reciprocated. Likewise, the piston 26 of the cylinder 24 is suitably connected to a pivot linkage means 28 which includes a pair of struts 29 which are each affixed to a respective end of a rotatable pin 17 so that upon reciprocal movement of the piston 26 within the cylinder 24, the pivot linkage 28 will be translated about the axes of the pins 17 and, correspondingly, the tread means 20 will be translated about the axes of the pins 17.

The cylinder 23 is pivotally mounted by a suitable pivot pin means 30 to a suitable bracket 31 on the underside of the vehicle 7 so as to pivot slightly upon reciprocal movement of the piston 25. Likewise, cylinder 24 is pivotally mounted by a suitable pivot pin means 32 to the base 16. Further, the cylinders 23, 24 are interconnected by a pair of flexible tubes 33, 34 which are connected to respective ends of the cylinders to transmit hydraulic fluid therethrough so that as the piston rod of tone hydraulic cylinder moves into its respective cylinder, the other piston moves out of its respective cylinder under hydraulic pressure. This relative movement is effected by connecting tube 33 to the rear ends of cylinders 23, 24 behind the respective pistons 25, 26 and tube 34 to the front ends of the cylinders 23, 24 forward of the respective pistons.

Referring to FIGS. 3 and 6, the base 16 of the retractable step 15 is secured, as by bolts 35, to the underside 36 of the vehicle frame immediately below the door on the driver's side. However, it is noted that the retractable step 15 may be utilized at any entranceway into a vehicle. When in this position, the hydraulic cylinder 24 on the base 16 of the retractable step 15 is connected through the tubes 33, 34 to the hydraulic cylinder 23 of the shaft 11.

In operation, with the vehicle 7 mounted on a railway track 6, as the actuating mechanism is activated to rotate the shaft 11 to move the roller 8 in the direction indicated by the respective arrow in FIG. 3, from its retracted position into a position of contact with a rail, the piston 25 retracts into the cylinder 23 and forces hydraulic fluid through tube 33 into cylinder 24 to force piston 26 out of the cylinder 24 so as to move the step 15 in the direction indicated by the respective arrow in FIG. 3, from its retracted position to its extended position. Once the roller 8 and step 15 are in their respective extended positions, they are simultaneously locked therein until the actuating mechanism is again activated. It is noted that the activation of this actuating mechanism is controlled in the usual manner from within the vehicle. Further, it is also noted that the limits of the step positions are coordinated with the limits of the roller positions so that the relative positions between the step and roller remain constant, that is, when the roller is fully extended so is the step. With the step 15 in the extended position, it provides an assist for a person leaving or entering the rail mounted vehicle. In order to retract the step 15 simultaneously with the roller 8, the actuating mechanism is activated in reverse order.

The amount by which the retractable step 15 depends from the vehicle body will depend on the distance between the rail and the underside of the vehicle frame; however, in all cases the dependent extent of the step and the longitudinal extent of the step will be within the space limitations of the vehicle. When the vehicle is riding on a paved roadway, the step which is in its retracted position will depend from the vehicle body a minimum distance which is substantially equal to the length of a leg 18 of the channel shaped base 16. Thus, the invention provides a compact space saving retractable step for vehicles adapted to ride on either railways or paved roadways.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. In combination with a convertible rail and highway vehicle having means for riding on paved roadways and retractable means for riding on railway tracks, a rotatable shaft having an arm with a flanged guide wheel mounted thereon and movable between rail engagement and disengagement positions, a retractable step comprising a channel-shaped base secured to the underside of said vehicle and foldable within itself in the longitudinal direction with respect to the vehicle, a plurality of struts rotatably mounted on said channel-shaped base and linkage means interconnecting said retractable step to said shaft, said linkage means including a first hydraulic cylinder pivotally mounted on the underside of said vehicle, said first hydraulic cylinder having a piston reciprocally mounted therein, a pivot means operably connecting said first piston to said rotatable shaft for reciprocable movement of said first piston upon reciprocal rotation of said shaft, a second hydraulic cylinder having a piston reciprocally mounted therein, a pivot linkage means connecting said last-named piston to said struts for rotating said struts on said base, and a pair of flexible tubes interconnecting respective opposite ends of said first and second hydraulic cylinders for transmitting hydraulic fluid therethrough from one cylinder to the other whereby movement of said first piston relative to said first hydraulic cylinder causes an opposite movement of the piston relative to said second hydraulic cylinder.

2. The combination as set forth in claim 1 including tread means carried on said struts.

3. The combination as set forth in claim 2 wherein said tread means includes a plurality of vertical plates having roughened upper surfaces.

References Cited

UNITED STATES PATENTS

| | | | |
|---|---|---|---|
| 2,118,557 | 5/1938 | Hamilton | 280—166 |
| 2,436,961 | 3/1948 | Gabriel | 280—166 |
| 2,575,615 | 11/1951 | Crump | 280—166 X |
| 3,020,858 | 2/1962 | Perkins et al. | 105—215 |
| 3,229,993 | 1/1966 | Riddle | 280—166 |

ARTHUR L. LA POINT, *Primary Examiner.*

H. BELTRAN, *Assistant Examiner.*